United States Patent
Wood et al.

[11] Patent Number: 5,739,950
[45] Date of Patent: Apr. 14, 1998

[54] BROADBAND PROTECTOR FOR PHOTODETECTORS

[76] Inventors: Gary L. Wood, 5448 New London Park Dr., Fairfax, Va. 22032; William W. Clark, III, 6847 Silver Ann Dr., Lorton, Va. 22079; Byong H. Ahn, 6501 Park View Ct., Springfield, Va. 22152; Edward J. Sharp, 14 Windsor Rd., Fredericksburg, Va. 22405

[21] Appl. No.: 411,157
[22] Filed: Sep. 1, 1989
[51] Int. Cl.⁶ ............................................ G02B 5/20
[52] U.S. Cl. ................................... 359/359; 359/885
[58] Field of Search ...................... 350/1.6, 311, 313, 350/354, 356; 372/703

[56] References Cited

U.S. PATENT DOCUMENTS

| | | | |
|---|---|---|---|
| 4,003,631 | 1/1977 | Biet et al. | 372/24 |
| 4,147,409 | 4/1979 | Apfel | 372/49 |
| 4,178,564 | 12/1979 | Ladeny et al. | 372/49 |
| 4,464,021 | 8/1984 | Brown et al. | 350/354 |
| 4,737,000 | 4/1988 | Garlick et al. | 350/1.7 |
| 4,832,448 | 5/1989 | Jones | 350/1.6 |

*Primary Examiner*—Ian J. Lobo
*Attorney, Agent, or Firm*—Milton W. Lee; Aubrey J. Dunn; Anthony T. Lane

[57] ABSTRACT

A trilaminar semiconductor device is placed at an intermediate focus is an optical instrument having a sensitive photodetector. The layers of the device are successively in the form of a two-photon absorber, a sacrificial layer, and a multiple quantum well. The composition of the semiconductor is varied in the layers to achieve the desired bandgap and function.

5 Claims, 1 Drawing Sheet

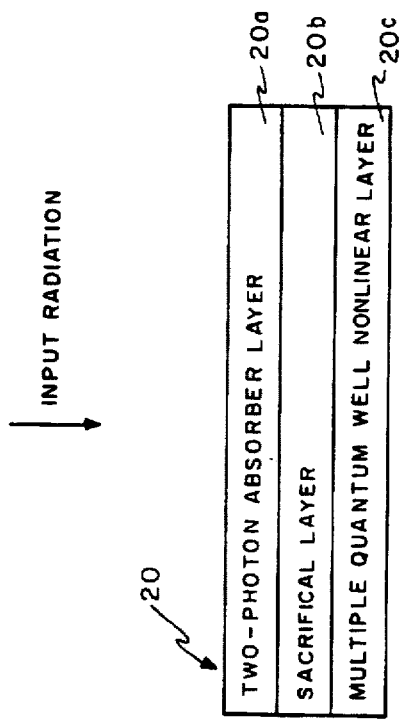
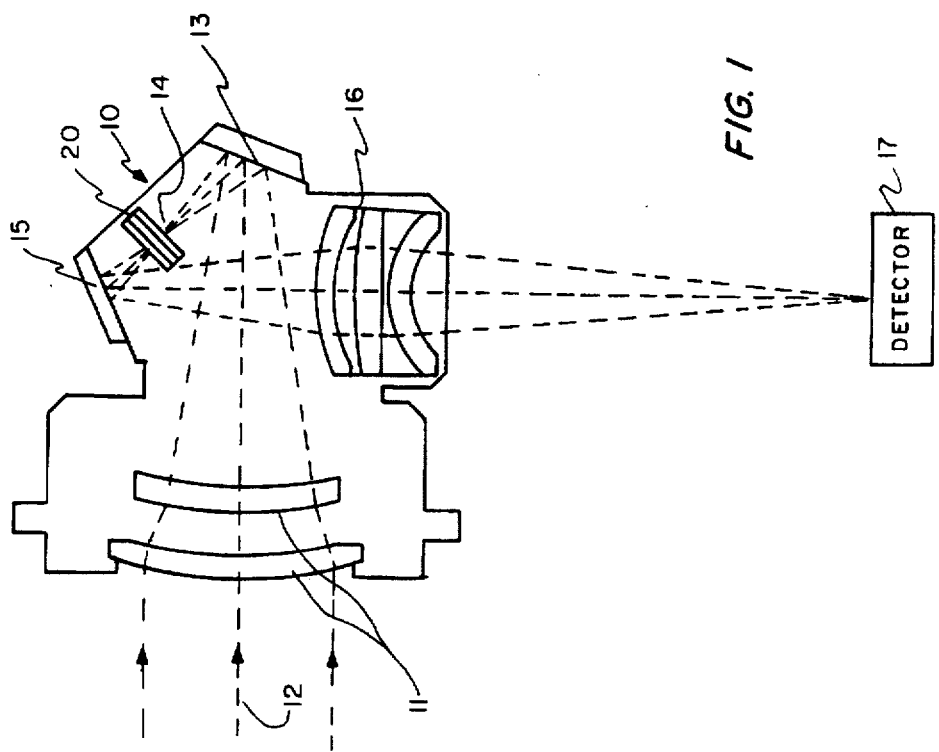
FIG. 2
FIG. 1

BROADBAND PROTECTOR FOR PHOTODETECTORS

The invention described herein may be manufactured, used, and licensed by the U.S. Government for governmental purposes without the payment of any royalties thereon.

BACKGROUND OF INVENTION

This invention is in the field of protectors for sensitive photodetectors. Such protectors take many known forms, all the way from active devices such as mechanically operated shutters and beam diverters, through electro-optical devices, to passive nonlinear optical materials and devices. An ideal protector must fulfill various requirements: it must not degrade or attenuate desired radiation, it must provide complete blocking of radiation above some predetermined threshold (harmful to the sensor), it must be sensitive over a sufficently wide optical bandwidth to block all undesired radiation, it must have a wide field-of-view, and it must (in many cases) be fast-acting. Unfortunately, in some cases, these requirements may be mutually contradictory. the radiation of interest (IR-scene) may be completely obscured by undesired radiation. Of late, there has been considerable interest in protecting infrared detectors against high-power infrared lasers such as line-tunable carbon dioxide ($CO_2$) lasers. Such detectors are used in night-vision devices by the military and are vulnerable to both damage and jamming (overload) in the presence of high-energy laser countermeasures. The output of such a laser could be at any nominal frequency within the response band of the detector in a night-vision device. In particular, sensitive infrared optical detectors used in systems with high optical gain (focusing) such as FLIRS can be rendered useless and even destroyed by accidental or deliberate illumination with intense far infrared (FIR) sources such as $CO_2$ lasers. The present invention overcomes this problem. The teachings of the invention can be used to passively protect night-vision devices and other sensitive photodetectors.

SUMMARY OF THE INVENTION

The invention is a broadband means for protecting a sensitive photodetector against high-intensity radiation, and is in the form of a trilaminar device. The layers of the device are chosen such that synergism results from the combination, compared to individual use of the layers. Particularly, the preferred embodiment of the invention uses $Hg_{1-x}Cd_xTe$ (mercury cadmium telluride) of various formulations such that one layer operates by two-photon absorption, another acts as a sacrificial layer, and the third acts as a multiple-quantum-well nonlinear optical material.

BRIEF DESCRIPTION OF THE DRAWINGS

FIG. 1 is a schematic showing of an optical instrument in which the invention may be used to advantage.

FIG. 2 is a schematic drawing (not to scale) of the inventive device.

DESCRIPTION OF PREFERRED EMBODIMENT

Referring now to the drawing figures, we see in FIG. 1 an optical instrument having a lens assembly generally designated 10. This assembly includes objective lenses 11 which direct incoming radiation 12 on mirror 13 to an intermediate focus 14. From 14, the radiation continues to lens 16 which focuses it on detector 17. The lenses and mirrors are designed such that the image spot intensity at intermediate focus 14 is higher than the intensity at detector 17. Positioned at focus 14 is the inventive protector device 20, shown in more detail in FIG. 2.

Turning to FIG. 2, we see a trilaminar device 20 consisting of layers 20a, 20b, and 20c. Although device 20 can be fabricated from a wide variety of materials, semiconducting materials are probably ideal, since they may readily be compounded for a particular bandwidth and easily fabricated as a composite structure. Accordingly, in the preferred embodiment of the invention, the semiconducting material $Hg_{1-x}Cd_xTe$ is used in three separate and distinct roles. The 8 micron to 12 micron wavelength atmospheric transmission window is exploited by $Hg_{1-x}Cd_xTe$ detectors because the bandgap, Eg. of the material falls within this spectral region. If, for example, the bandgap of the material is set to absorb 10 micron radiation (Eg=124 meV, x=0.225, at T=77K), then all wavelengths shorter than 10 microns will be absorbed but longer wavelengths will be transmitted at low incident intensities.

Layer 20a of FIG. 2 is compounded as taught in U.S. patent application Ser. No. 213,873, Filed Jun. 30, 1988 now abandoned, by some of the instant inventors (an, d others) and acts as a two-photon absorber. Its thickness $d_{TPA}$ is such that $$d_{TPA} > \frac{2\pi r_o^2 n}{\lambda_o}$$

and $d_{TPA} < d_{max}$, wherein $d_{max}$ is the maximum device thickness (all three layers of 20) which will allow a predetermined minimum acceptable amplitude of electromagnetic radiation to reach a photodetector, for quiescent (i.e., not limiting high-intensity radiation) operation of the device, $r_o$ is the focus spot size at the device, n is index of refraction of the semiconductor, and $\lambda_o$ is a nominal incident radiation wavelength. Extremely high intensity radiation will be absorbed in layer 20a and rendered harmless to the detector.

Layer 20b gives protection by acting as a sacrificial element for extreme overloads (high-intensity radiations) that are not high enough to activate the two-photon absorber but will damage the detector an avalanche plasma occurs which limits overloads by scattering, reflection, and absorption. This layer is relatively heavily doped HgCdTe with a bandgap similar to that of the photodetector being protected (hereinafter called "detector"). The high dopant level serves to enhance the available free carriers over that of the detector. Although local degradation of the layer may occur, there may still be sufficient area remaining to transmit a usable amount of energy to the detector. The thickness $d_s$ of layer 20b of this layer is chosen as follows:

$$d_s \leq \frac{2\pi r_o^2 n}{\lambda_o}.$$

For the overload radiation that gets past layers 20a and 20b, and does not activate either one, layer 20c serves to a self-defocussing or scatter radiation that would otherwise saturate the detector. It is made as a $H_{g1-x}Cd_xTe$ compound whose composition varies in a sawtooth manner from x=0.008 to 0.30 through the thickness of the material, with the wavelength of the sawtooth being on the order of 250 Å. Such a structure is known as a multiple quantum well or superlattice. This layer may be made as taught in the article "Growth of HgCdTe epilayers with any predesigned compositional profile by laser molecular beam epitaxy" on page 705–708 of the May/Jun. 1987 *Journal of Vacuum Science Technology*. The thickness $d_{MQW}$ of 20c is a large as possible, as long as $(d_{MQW}+d_s+d_{TPA})<d_{max}$. Layer 20c thus serves to prevent saturation or overload of the detector for radiation which passes through layers 20a and 20b.

The individual layers 20a, 20b, and 20c of device 20 may be fabricated as separate entities and optically bonded together. Although we have described only compounds of mercury cadmium telluride, obviously other ternary semiconductor materials may be used. Moreover, all the layers need not be made of the same material. If all the layers are of the same material, only the bandgap and thickness of the layers need be adjusted in a single piece of material to fabricate a limiter with the desired characteristics. The combined layers work together to create an effective device, each layer is designed to limit radiation to a level safe for the succeeding layers or layer. No single layer can protect detector over the large variation in possible threat lasers with adequate dynamic range.

If a material other than mercury cadimium teluride is used in order to protect a detector responding to a spectral band outside the 8-12 micron region, the protector must meet the following requirements:

(a) the first layer should be a TPA for the particular wavelengths the detector responses to, (b) the second layer should be made of the detector material or a material that is more sensitive to radiation damage than is the detector, (c) the third layer should be a nonlinear scatterer such as a liquid particle suspension, or an embedded liquid crustal polymer or a multiple quantum well/superlattice.

We claim:

1. Broadband means for protecting a sensitive photodetector in an optical instrument against high-intensity electromagnetic energy, said means being in the form of a trilaminar device, of thickness less than $d_{max}$, wherein $d_{max}$ is the maximum device thickness which will allow a predetermined minimum amplitude of electromagnetic radiation to reach said photodetector, said device placed at an intermediate focus of the optical instrument, wherein the device includes:

a first layer of material which exhibits two-photon absorption in the presence of extremely high-intensity electromagnetic radiation;

a second layer of material which undergoes thermal damage in the presence of intermediate high-intensity electromagnetic radiation; and a third layer of a nonlinear optical material which acts as a scatterer in the presence of saturating but non-damaging high-intensity electromagnetic radiation, wherein below a predetermined electromagnetic radiation intensity level, said device is at least partially transparent to said electromagnetic radiation, as determined by $d_{max}$.

2. The means as set forth in claim 1 wherein said first layer has a thickness $d_{TPA}$ such that $$d_{TPA} > \frac{2\pi r_o^2 n}{\lambda_o}$$

and $d_{TPA}<d_{max}$, and wherein $r_o$ is the focus spot size at the device, n is index of refraction of the layer, and $\lambda_o$ is a nominal incident radiation wavelength.

3. The means as set forth in claim 2 wherein said second layer has a thickness $$d_s \leq \frac{2\pi r_o^2 n}{\lambda_o}$$

and $d_s+d_{TPA}<d_{max}$.

4. The means as set forth in claim 2 wherein said third layer has a thickness $d_{MQW}$ such that $d_{TPA}+d_{TPA}+d_{MQW}<d_{max}$ and is a multiple quantum well or superlattice.

5. The means as set forth in claim 1 wherein said layers are each made of at least one layer of a mercury cadmium telluride compound.

* * * * *